United States Patent [19]

Kobayashi et al.

[11] Patent Number: 4,764,830

[45] Date of Patent: Aug. 16, 1988

[54] MAGNETIC HEAD ASSEMBLY IN FLOPPY DISK DRIVE

[75] Inventors: Kazuo Kobayashi; Masao Kumagai; Atsushi Takahashi, all of Furukawa; Kenji Abe, Minamikata, all of Japan

[73] Assignee: Alps Electric Co., Ltd., Japan

[21] Appl. No.: 929,384

[22] Filed: Nov. 10, 1986

[30] Foreign Application Priority Data

Nov. 9, 1985 [JP] Japan ................... 60-249971

[51] Int. Cl.$^4$ .............................................. G11B 5/48
[52] U.S. Cl. ...................................... 360/104; 360/105
[58] Field of Search ............... 360/104, 103, 105, 109, 360/97–99

[56] References Cited

U.S. PATENT DOCUMENTS

| 4,379,316 | 4/1983 | Krane | 360/104 X |
| 4,658,315 | 4/1987 | Seki et al. | 360/104 |
| 4,661,872 | 4/1987 | Saito | 360/104 |

Primary Examiner—John H. Wolff
Attorney, Agent, or Firm—Guy W. Shoup; Leighton K. Chong

[57] ABSTRACT

A magnetic head assembly including a carriage carrying a first magnetic head for recording information on, and reproducing it from, one side of a magnetic recording medium in the form of a disk, and a holding case connected to the carriage rotatably by a leaf spring and carrying a second magnetic head disposed opposite the first magnetic head for recording information on, and reproducing it from, the opposite side of the medium. The first magnetic head is supported on the carriage by a gimbal spring supported on a pivot, while the second magnetic head is secured to the holding case. The pivot is supported by a nonelastic member provided in the carriage. The gimbal spring has an outer portion at which it is attached to the carriage, and an inner portion projecting from its outer portion toward the holding case. The pivot contacts the inner portion of the gimbal spring.

3 Claims, 2 Drawing Sheets

MAGNETIC HEAD ASSEMBLY IN FLOPPY DISK DRIVE

BACKGROUND OF THE INVENTION

1. Field of the Invention

This invention relates to a magnetic head assembly in a device for driving a double-sided magnetic recording medium in the form of a disk, i.e., of the type in which information can be recorded on, and reproduced from, both sides thereof.

2. Description of the Prior Art

There is known a device for driving a magnetic recording medium in the form of a disk which can have information recorded on, and reproduced from, both sides thereof. Three types of devices are known and differ from one another in the position of a magnetic head which is supported on a gimbal spring. The first type of device is of the type having a movable top and a fixed bottom and has a gimbal spring provided on a holding case. The second type is of the type having a fixed top and a movable bottom and has a gimbal spring provided on a carriage. The third type is of the type having a movable top and a movable bottom and has a gimbal spring provided on both of a holding case and a carriage. The first type is widely used, as it has a reference plane which is easy to define, since the carriage is directly guided by a guide bar. The second type has a reference plane which is difficult to define, since the holding case is rotatably supported on the carriage. The third type has a reference plane which is still more difficult to define, though it is satisfactory in followup characteristics. Therefore, it is usual to limit the movement of the gimbal spring on the carriage. Thus, it is, in fact, of the type having a movable top and a semi-stationary bottom.

A further improvement is expected from the second type of device, since it can be superior to the first type in followup characteristics, though it has a reference plane which is more difficult to define. The first type of device has two movable portions on the holding case, i.e., the gimbal spring and the junction between the holding case and the carriage. A secondary delay occurs to those two portions when they follow the deformation of a magnetic disk. On the other hand, the second type of device has no such delay, as only the gimbal spring on the lower magnetic head is movable, while the position of the upper magnetic head does not appreciably change. A device of the second type is typically shown in FIG. 3.

The magnetic head supporting mechanism shown in FIG. 3 consists mainly of an arm (holding case) 34 carrying a magnetic head 32 and a carriage 36 on which a magnetic head 33 is mounted. The arm 34 is rotatably supported on a leaf spring hinge 35 projecting from the sidewall 36a of the carriage 36. A coiled spring 37 is provided between the arm 34 and the top wall 36b of the carriage 36 for applying an appropriate load to the arm 34. The upper magnetic head 32 is secured to the bottom of the arm 34. The lower magnetic head 33 is supported by a gimbal spring 38 on the bottom wall 36c of the carriage 36. The upper and lower magnetic heads 32 and 33 face each other and a flexible magnetic disk 31 can be held therebetween. The bottom wall 36c of the carriage 36 has a through hole formed below the gimbal spring 38. A leaf spring 41 has one end secured to the bottom wall 36c and extends into the hole. The leaf spring 41 has a free end provided with a pivot 40 engaging the bottom of the gimbal spring 38 and thereby supporting it resiliently thereon.

When the disk 31 is disposed between the magnetic heads 32 and 33, the leaf spring 41 allows the lower megnetic head 33 to move down and a balance is reached between the downward force of the coiled spring 37 and the upward force of the leaf spring 41 to hold the disk 31 in a stable position in which the disk 31 has a reference plane extending in parallel to the mutually facing surfaces of the magnetic heads 32 and 33 so that the disk 31 may be driven for recording or reproduction purposes.

The device as hereinabove described has, however, a number of drawbacks. Only that corner 32a of the upper magnetic head 32 which is closer to the hinge 35 contacts the disk 31 before the lower magnetic head 33 is moved down, and the force of the coiled spring 37 is concentrated on the corner 32a. The corner 32a is, therefore, very likely to damage the disk 31. When the lower magnetic head 33 is moved down, the gimbal spring 38 is greatly deformed and if random vibration is transmitted from the disk 31 to the magnetic head 33, the gimbal spring 38 is likely to resonate and produce an audible resonant sound. This phenomenon may be called the sobbing of the head.

SUMMARY OF THE INVENTION

It is, therefore, an object of this invention to provide a magnetic head assembly of the second type in which the height and parallelism of a lower magnetic head can be accurately defined without causing any damage to a disk when it is loaded It is another object of this invention to provide a magnetic head assembly of the same type which is substantially free from any head sobbing.

These objects are attained by a magnetic head assembly comprising a carriage carrying a first magnetic head for recording information on, or reproducing it from, one side of a magnetic recording medium in the form of a disk, and a holding case carrying a second magnetic head provided opposite the first magnetic head for recording information on, or reproducing it from, the opposite side of the magnetic recording medium and connected rotatably to the carriage by a leaf spring hinge, the first magnetic head being supported on the carriage by a gimbal spring having a pivot, while the second magnetic head is secured to the holding case, characterized in that the pivot is supported by a nonelastic member on the carriage, and that the gimbal spring has a portion on which the first magnetic head is supported, and which projects toward the holding case from a point at which the gimbal spring is attached to the carriage, so that the first magnetic head may be supported on the pivot.

According to this invention, the pivot is supported on the nonelastic member which is not deformable, and supports the lower magnetic head from behind the gimbal spring. It urges the lower magnetic head upward to some extent toward the upper magnetic head. Therefore, it is possible to define accurately the height of the lower magnetic head and its parallelism to the upper magnetic head. The gimbal spring is held under tension so that its tension may prevent the generation of any resonant sound having an audible frequency and thereby any head sobbing.

DETAILED DESCRIPTION OF THE INVENTION

Figure 1:
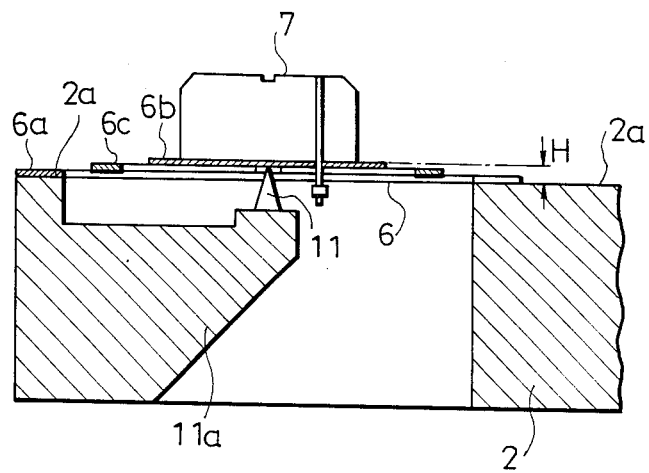
FIG. 1 is a schematic view, partly in section, of a structure for supporting a gimbal spring in a magnetic head assembly embodying this invention.
Figure 2:
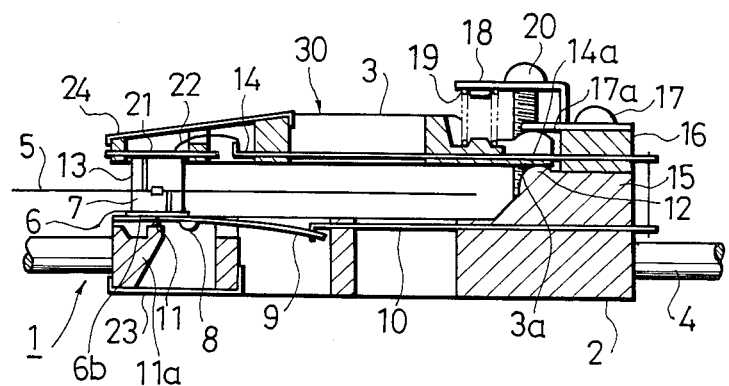
FIG. 2 is a vertical sectional view of the magnetic head assembly.

Referring to FIGS. 1 and 2, there is shown a magnetic head assembly embodying this invention and comprising a lower half 2 and an upper half 30. The magnetic head assembly is movable radially of a magnetic disk 5 along a guide shaft 4 by a pulsed motor not shown. A lower magnetic head 7 is supported by a gimbal spring 6 on the front end of the lower half 2 of the assembly, or carriage. The carriage 2 includes a flexible printed base 9 connected to a lead wire 8 extending from the magnetic head 7, and a lead terminal 10 connected to the base 9 and projecting from the rear end of the carriage 2. The lead terminal 10 includes a metal strip of good conductivity divided in five and insert molded in an electrically insulating synthetic resin. It has an inner end located near the gimbal spring 6. The carriage 2 is a molded product and further includes a pivot 11 engaging the bottom of the gimbal spring 6 directly below the magnetic head 7 to ensure the proper contact of the magnetic head 7 with the disk 5, and a support 12 having a cylindrical contact surface supporting a holding case 3 directly thereon. The pivot 11 projects from a nonelastic pivot support member 11a molded from the insulating synthetic resin from which the carriage 2 is formed, and forming an integral part thereof. The pivot 11 projects slightly above the top surface 2a of the carriage 2 to which the gimbal spring 6 is attached, as shown in FIG. 1. Therefore, it urges the gimbal spring 6 slightly upwardly toward the upper half 30 of the assembly. The height H by which the gimbal spring 6 is urged upwardly depends on various factors including the dimensions and material of the gimbal spring 6 and the weight of the magnetic head 7. It may, for example, be from about 0.05 to 0.15 mm if the disk is a floppy disk having a diameter of 3.5 inches.

The upper half 30 of the assembly comprises the holding case 3, a holding plate 16 and a leaf spring hinge 14 supporting the holding case 3 rotatably on the holding plate 16. The holding case 3 has at its front end a plate 21 to which an upper magnetic head 13 facing the lower magnetic head 7 is secured. A loading spring 19 extends from a holding plate 18 and engages the holding case 3 to urge it toward the carriage 2. The force of the spring 19 is appropriately adjustable by a loading force adjusting screw 20 passed through the holding plate 18.

The leaf spring hinge 14 and the plate 21 may be formed by insert molding a single leaf spring of good conductivity and cutting it into appropriate shapes. The hinge 14 has one end located near the plate 21 which is of the nonelastic construction. The hinge 14 may, for example, include five separate segments. Five lead wires 22 extend from the magnetic head 13 and are bonded to the plate 21 by an adhesive. Each lead wire 22 is connected to one of the five segments of the hinge 14 so that each of the segments may serve as a lead terminal. Three of the lead wires 22 are provided for reading and writing purposes, and the other two for erasure purposes.

The carriage 2 includes a noise shielding plate 23 disposed below the lower magnetic head 7. Likewise, the holding case 3 includes a noise shielding plate 24 provided above the upper magnetic head 13. The hinge 14 has a portion 14a at which the holding case 3 is rotatably supported. The holding case 3 has a portion 3a resting on the support 2 in the carriage 2 and laterally projecting from the hinge portion 14a. Thus, the holding case 3 is rotatable along the cylindrical surface of the support 12. The holding plate 16 is connected by a screw 17 to the rear end 15 of the carriage 2 at an appropriate level of height above the support 12. A holding plate 17a is secured to the holding plate 16 by the screw 17 and extends over the case portion 3a to hold the case 3 against any vertical displacement due to vibration or impact from an external source and thereby protect the magnetic heads 7 and 13 against damage.

The pivot supporting member 11a may be formed from any appropriate material or may be of any construction if it is not elastic. The gimbal spring 6 has an outer edge portion 6a at which it is secured to the carriage 2, and a central supporting portion 6b which is supported by a spring frame 6c in two directions perpendicular to the outer edge portion 6a, and on which the lower magnetic head 7 is supported. It is a biaxial gimbal spring. It is, equally possible to use a gimbal spring having a central supporting portion 6b which is supported in only one direction, and not having any spring frame 6c.

The one or two-axis spring frame 6c allows the supporting group 6b to move flexibly in the axial direction(s). The gimbal spring structure is considered conventional and not described further herein.

Figure 3:
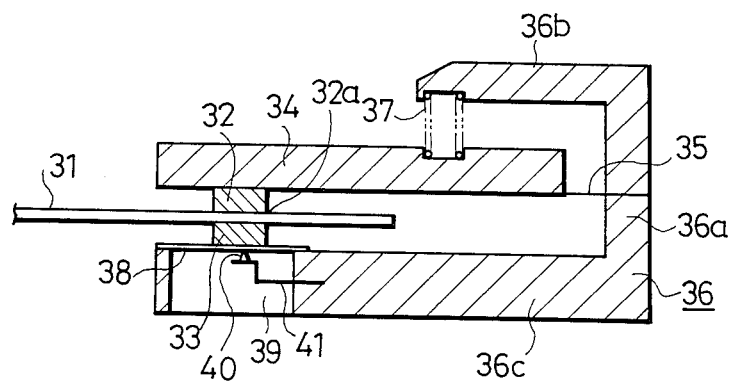
FIG. 3 is a schematic sectional view of a known magnetic head assembly.

According to the assembly hereinabove described, the pivot 11 and the pivot supporting member 11a are formed from the nonelastic insulating synthetic resin and each form an integral part of the carriage 2, and the pivot 11 contacts the bottom surface of the gimbal spring 6 in such a way that it may urge it upward toward the upper magnetic head 13. The urging of the supporting portion 6b upward by the small height H assures that it will be oriented parallel under the balanced tension of spring forces. Even if the holding case 3 is urged down by the spring 19, the position of the lower magnetic head 7 remains unchanged and whenever the upper magnetic head 13 is brought into contact with the disk 5, its contact surface is in parallel to the surfaces of the disk 5 and the lower magnetic head 7. The assembly, therefore, makes it possible to define an accurate reference plane for the disk and enables the magnetic heads to follow the deformation of the disk in an improved fashion. There is no partial contact of any corner of the upper magnetic head 13 with the disk 5 as hereinbefore pointed out with reference to the corner 32a in FIG. 3. The gimbal spring 6 is held under tension and does not sag. Therefore, it does not cause any appreciable resonance and even if it may resonate, its resonance has so high a frequency as not to produce any audible sound, or any head sobbing.

Although the invention has been described with reference to a preferred embodiment thereof, it is to be understood that modifications or variations may be easily made by anybody of ordinary skill in the art without departing from the scope of this invention which is defined by the appended claims.

What is claimed is:

1. In a magnetic head assembly comprising a carriage movable horizontally and carrying a first magnetic head on one end thereof for recording on and reproducing information from a magnetic disk, and a holding case pivotably mounted by a leaf spring on said carriage and carrying a second magnetic head on one end thereof which is pivotable toward said one end of said carriage so as to bring said second magnetic head facing opposite said first magnetic head with the magnetic disk interposed therebetween, wherein the improvement comprises:

said first magnetic head being carried on said one end of said carriage by a gimbal spring having an outer edge portion mounted on said carriage so as to be lie in a horizontal plane, a head supporting portion disposed centrally within said outer edge portion and supporting said first magnetic head on an upper side thereof, and a spring frame connecting said head supporting portion to said outer edge portion so to be flexible on a horizontal axis of said gimbal spring, and by a nonelastic member provided on said carriage having a pivot thereon which bears against a lower side of said head supporting portion so as to project it vertically under spring tension of said spring frame by a small height above the horizontal plane of said outer edge portion.

2. A magnetic head assembly as set forth in claim 1, wherein said nonelastic member is formed from an electrically insulating synthetic resin and said pivot forms an integral part of said nonelastic member.

3. A magnetic head assembly as set forth in claim 2, wherein said pivot and said nonelastic member form an integral part of said carriage.

* * * * *